United States Patent
Schmid et al.

[11] Patent Number: 5,934,179
[45] Date of Patent: Aug. 10, 1999

[54] KITCHEN APPLIANCE WITH IMPROVED DRIVE UNIT

[75] Inventors: Günther Schmid, Ferlach; Martin Sonnek, St. Veit/Glan, both of Austria

[73] Assignee: U.S. Philips Corporation, New York, N.Y.

[21] Appl. No.: 09/102,836

[22] Filed: Jun. 23, 1998

[30] Foreign Application Priority Data

Jun. 23, 1997 [EP] European Pat. Off. .............. 97890112

[51] Int. Cl.⁶ .......................... A47J 43/04; A47J 43/044; A47J 44/00; B01F 7/16
[52] U.S. Cl. ................................ 99/337; 99/348; 99/492; 99/510; 366/279; 366/601; 241/37.5; 241/92
[58] Field of Search .............................. 99/325–331, 348, 99/492, 509–511, 484, 485, 486, 337; 62/342, 343, 437, 529, 136; 219/497, 494, 501, 506, 707; 241/37.5, 92; 310/39, 41, 51, 83, 261, 265; 318/432, 446, 434, 286, 254, 291, 439; 366/144–146, 149, 279, 314, 601, 199, 205, 206

[56] References Cited

U.S. PATENT DOCUMENTS

| | | | |
|---|---|---|---|
| 4,681,030 | 7/1987 | Herbert | 99/486 X |
| 4,716,823 | 1/1988 | Capdevila | 99/510 |
| 5,207,506 | 5/1993 | Musseau et al. | 366/601 X |
| 5,520,094 | 5/1996 | Lu | 99/327 |
| 5,524,530 | 6/1996 | Nijzingh et al. | 99/492 |
| 5,549,042 | 8/1996 | Bukoschek et al. | 62/342 X |

*Primary Examiner*—Timothy F. Simone
*Attorney, Agent, or Firm*—Ernestine C. Bartlett

[57] ABSTRACT

In a kitchen appliance (1) comprising a container (2) and a drive unit (9) adapted to be placed onto the container (2) and having a housing (10) which accommodates a motor (21) of the drive unit (9), the housing (10) carries in the area of its housing cover wall an actuator grip (26) for actuating a retaining device (40) arranged in the housing (10) and, by moving the actuator grip (26) from a rest position into an operating position, the retaining device can be set from a disengaged position into a retaining position in which the drive unit (9) and the container (2) are coupled to one another so as to form a firmly coupled assembly with the aid of the retaining device (40).

10 Claims, 6 Drawing Sheets

KITCHEN APPLIANCE WITH IMPROVED DRIVE UNIT

BACKGROUND OF THE INVENTION

The invention relates to a kitchen appliance comprising a container for holding food products, which container comprises a bottom wall for placing the container on a working surface during operation of the kitchen appliance and a peripheral wall connected to the bottom wall, which peripheral wall terminates in a container rim which is remote from the bottom wall, and comprising a drive unit, which comprises a housing with which the drive unit can be placed onto the container in the area of the container rim, which housing accommodates a motor of the drive unit for driving at least one tool situated in the container during operation.

Such a kitchen appliance of the type defined in the opening paragraph is known, for example, from the document EP 0 396 178 B1. In the known kitchen appliance the drive unit is placed onto the container in substantially the same way as a lid onto a pot, after which the electric motor accommodated in the drive unit is switched on by pressing the drive unit down onto the container rim of the container, causing the tool present in the container during operation to be driven. In the known kitchen appliance the container is hollow cylindrical and consequently has an annular container rim with which the housing of the drive unit engages with a correspondingly annular abutment zone. When the abutment zone of the housing of the drive unit has been pressed down by hand onto the container rim of the container the container is retained only by the frictional engagement between the container rim of the container and the abutment zone of the housing of the drive unit. As a result of this, the known kitchen appliance is not intended for using this kitchen appliance for processing ingredients which adhere comparatively strongly to the container and which present a comparatively high resistance to a tool, as for example in the case of the preparation of a compact dough, because in such cases comparatively large torques can occur between, on the one hand, the driven tool and thus the drive unit and, on the other hand, the container and may lead to a rotation of the container with respect to the drive unit, which is undesirable. Furthermore, with the known kitchen appliance the situation can arise that when the drive unit is not pressed properly by hand onto the container rim of the container—which is the case if during pressing down the drive unit is subjected to a force which is oriented at a comparatively large angle to a direction perpendicular to the bottom wall of the container—the container may be tilted away from underneath the drive unit which is not pressed down properly by hand, as a result of which the container and the manually held-down drive unit are moved away from each other in an undesirable manner, which results in undesirable tipping over of the container and spilling of ingredients present in the container and furthermore causes a dangerous problem since the tool is driven rotationally without any protection after the container and the drive unit have moved apart.

SUMMARY OF THE INVENTION

It is an object of the invention to preclude the aforementioned problems and to provide an improved kitchen appliance which requires only simple means and a small expenditure to preclude said problems. In order to achieve this object, according to the invention, a kitchen appliance of the type defined in the opening paragraph is characterized in that in the area of the housing cover wall, which is remote from the bottom wall of the container when the drive unit has been placed onto the container in the area of the container rim, the housing carries an actuator grip which is movable between a rest position and an operating position, which actuator grip is equipped with actuating means, and a retaining device has been provided in the housing, which retaining device, when the drive unit has been placed onto the container, extends from the actuator grip, which is situated in the area of the housing cover wall, up to the container rim of the container and which, when the actuator grip is moved between its rest position and its operating position, is movable between a disengaged position and a retaining position with the aid of the actuating means of the actuator grip and by means of which, in the retaining position, the drive unit can be coupled to the container. Thus, it is achieved with simple means and with only a small expenditure that after the drive unit has been placed onto the container, which can be effected by hand, the drive unit and the container are coupled to form an assembly which is coupled in operation of the kitchen appliance by simply actuating the movable actuator grip arranged in the area of the housing cover wall of the housing, as a result of which a rotation of the container with respect to the drive unit is impossible and it is excluded that the container and the drive unit are moved apart.

It is to be noted that a kitchen appliance is already commercially available, which comprises a container having a bottom wall for placing the container onto a working surface during operation of the kitchen appliance and a drive unit which can be placed onto the container. However, in order to enable the drive unit of this known kitchen appliance to be placed onto the container the drive unit should be coupled to a cover for the container before this unit is placed onto the container, which is effected in that the drive unit is slid with two guideways onto two guide members of the cover, the housing of the drive unit and the cover being locked to one another at the end of this sliding movement by means of a locking device which is disengageable by hand. After the drive unit and the cover have been coupled the resulting assembly can be placed onto the container. Between the cover and the container a bayonet-type locking device has been provided, as is also known per se from so-called steam pressure cookers. By means of the bayonet-type locking device the cover and, consequently, the drive unit is coupled to the container. In this known kitchen appliance a rotation of the container with respect to the drive unit and an undesirable disengagement of the container and the drive unit are impossible but this requires a substantial expenditure and a comparatively costly and comparatively intricate construction of the kitchen appliance. Moreover, as regards this known kitchen appliance it is to be noted that this appliance requires a fairly complicated procedure to couple the drive unit to the container by means of the cover before the kitchen appliance can be put into operation. Conversely, a kitchen appliance in accordance with the invention is of a particularly simple construction and can be assembled and put into operation by means of a very simple procedure.

Thus the invention provides a container for holding food products, which container comprises:

a bottom wall for placing the container on a working surface during operation of the kitchen appliance and a peripheral wall connected to the bottom wall, which peripheral wall terminates in a container rim which is remote from the bottom wall, a drive unit which comprises a housing with which the drive unit can be placed onto the container in the area of the container rim, which housing accommodates a motor of the drive unit for driving at least one tool situated in the container during operation, wherein in the area of the housing cover wall, which is remote from the bottom wall of the container when the drive unit has been placed onto the container in the area of the container rim, the housing carries an actuator grip which is movable between a rest position and an operating position, which actuator grip is equipped with actuating means, and a retaining device provided in the housing, which retaining device, when the drive unit has been placed onto the container, extends from the actuator grip, which is situated in the area of the housing cover wall, up to the container rim of the container and which, when the actuator grip is moved between its rest position and its operating position, is movable between a disengaged position and a retaining position with the aid of the actuating means of the actuator grip and by means of which, in the retaining position, the drive unit can be coupled to the container.

In such a device it has proved to be very advantageous if the retaining device comprises at least one latch which is mounted in the housing so as to be movable, which latch cooperates with the actuating means of the actuator grip in the area of a first end and with the peripheral wall of the container at the location of the container rim in the area of a second end. This is advantageous in view of a particularly simple construction.

In a kitchen appliance in accordance with the invention having the above described characteristic features, it has proved to be very advantageous if, in addition, the retaining device comprises two diametrically opposed latches. In practice, such an embodiment has proved to be particularly advantageous because it guarantees a particularly effective and reliable fastening.

In a kitchen appliance in accordance with the invention having such diametrically opposed latches, the second end portion of each of the two latches can have teeth and can cooperate with teeth provided on the peripheral wall of the container in the area of the container rim. However, it has proved to be particularly simple and advantageous if, in addition, at its second end each of the two latches of the retaining device comprises a retaining pin which projects from the latch, and in the area of the container rim the container has two passages in its peripheral wall, and the retaining pin of each of the two latches engages a passage when the retaining device is in its retaining position. This is advantageous in view of a particularly reliable cooperation of the latch with the container.

In a kitchen appliance in accordance with any of the embodiments of the invention described above, the invention it has further proved to be advantageous if, in addition, the actuator grip, which is movable from its rest position into its operating position, can be moved in the given actuating direction from its operating position into a further operating position in which the motor of the drive unit is activated and in which the drive unit is coupled to the container by means of the retaining device. In this way, it is achieved that the actuator grip is used not only for actuating the retaining device but also for activating the motor accommodated in the drive unit.

As regards the construction of the actuating means of the actuator grip of a kitchen appliance in accordance with the invention, it has proved to be very advantageous if, in addition, the actuating means of the actuator grip have at least one actuating slot which forms a guide slot, in which an actuating pin which projects from the retaining device engages. This is very advantageous in view of a particularly reliable actuation of the retaining device.

In a kitchen appliance in accordance with the invention the actuator grip can be formed by, for example, a sliding knob. However, in a kitchen appliance in accordance with the invention it has proved to be very advantageous if, in addition, the actuator grip is formed by a rotary knob which is mounted so as to be rotatable with respect to the housing cover wall are taken. Such a rotary knob has proved to be a particularly effective and easy to operate actuator grip in conjunction with a kitchen appliance.

In such a kitchen appliance in accordance with the invention, it has further proved to be particularly advantageous if, in addition, the housing of the drive unit is dome-shaped, and the rotary knob forming the actuator grip is arranged essentially in the apex area of the housing cover wall of the housing. In this way, a particularly easy actuation of the rotary knob is possible.

The afore-mentioned aspects as well as further aspects of the invention will be apparent from the embodiment described hereinafter by way of example and will be elucidated by means of this embodiment.

BRIEF DESCRIPTION OF THE DRAWINGS

The invention will now be described in more detail with reference to an embodiment shown in the drawings and given by way of example, but to which the invention is not limited.

DESCRIPTION OF THE PREFERRED EMBODIMENTS

Figure 1:
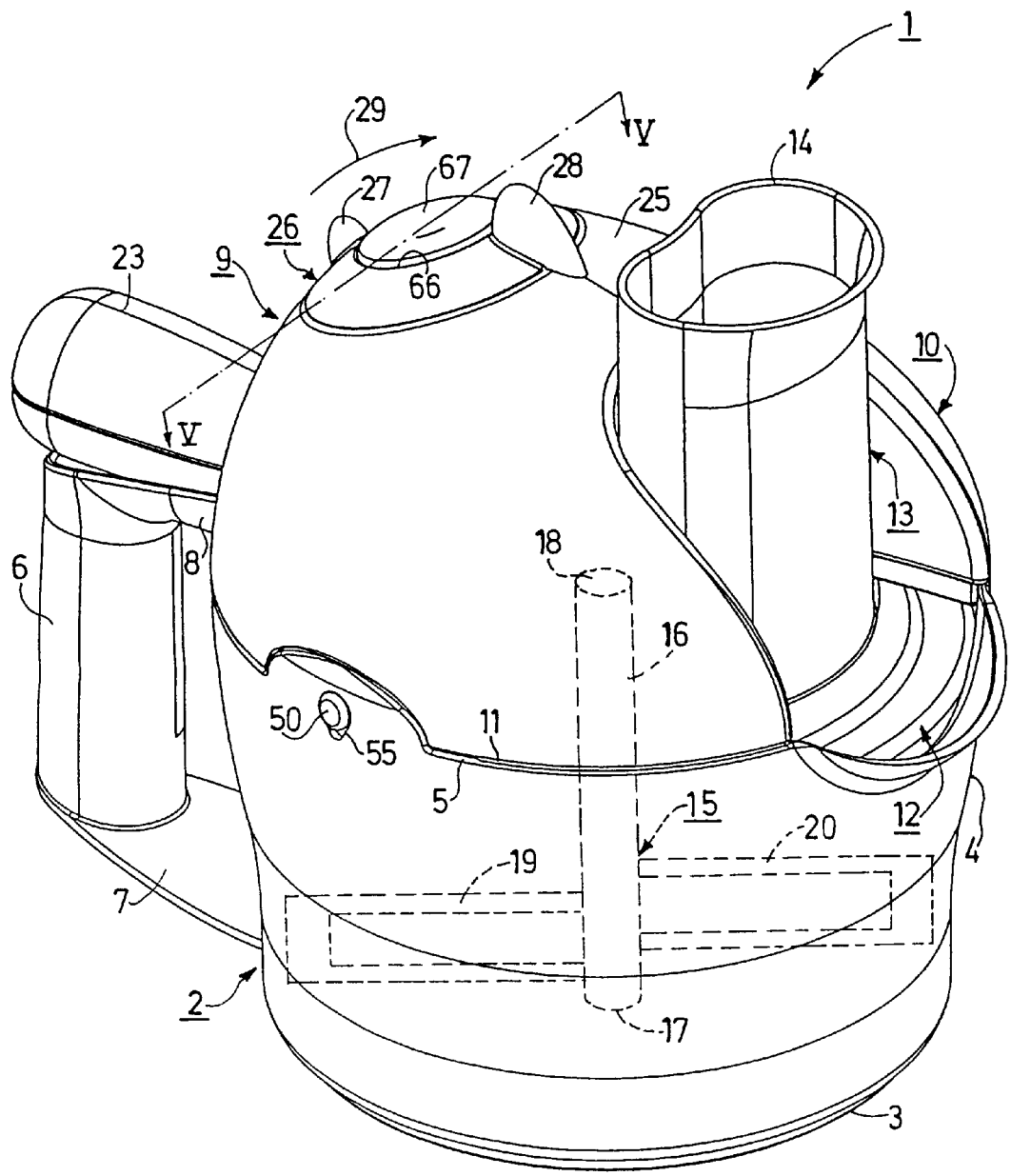
FIG. 1 is an oblique view from the top, showing a kitchen appliance in accordance with an embodiment of the invention, which appliance comprises a container and a drive unit adapted to be placed onto the container and having a dome-shaped housing which carries in its top area a movable actuator grip for actuating a retaining device arranged in the housing.

FIG. 1 shows a kitchen appliance 1. The kitchen appliance 1 comprises a container 2 for holding food products. The container 2 comprises an imperforate bottom wall 3 for placing the container 2 on a working surface, not shown, during operation of the kitchen appliance 1 and a peripheral wall 4 connected to the bottom wall 3. The peripheral wall 4 is of circular cross-section, its diameter being chosen to increase slightly in a direction away from the bottom wall. The peripheral wall 4 terminates in a container rim 5 which is remote from the bottom wall 3. A carrying handle 6 is connected to the container 2. To connect the carrying handle 6 to the container 2 there have been provided a substantially plate-shaped first connecting member 7 and a substantially trough-shaped second connecting member 8, the first connecting member 7 being connected to the container 2 in the area of the bottom wall 3 and the second connecting member 8 being connected to said container in the area of the container rim 5.

The kitchen appliance 1 further comprises a drive unit 9. The drive unit 9 comprises a housing 10, with which the drive unit 9 can be placed onto the container 2 in the area of the container rim 5. In the mounted condition of the drive unit 9 the housing 10 bears on the container rim 5 with a rebate 11 of the container rim 5, as can also be seen in FIGS. 4 to 6.

It is to be noted that before the drive unit 9 is placed onto the container 2 a cover 12 is to be placed into the container 2, which cover is supported on an inner rebate of the container 2. The cover 12 mainly serves as a splash guard. A filling tube 13 is connected to the cover 12 and has an open end 14 through which food products can be introduced into the container 2.

During operation of the kitchen appliance 1 a tool 15, which shown only diagrammatically in FIG. 1, is disposed in the container 2. The tool 15 comprises a drive shaft 16, which at its end 17 which faces the bottom wall 3, is rotably supported in a bearing projection, not shown, which projects from the bottom wall 3 and whose end 18 which is remote from the bottom wall 3 is passed through an opening, not shown, in the cover 12. In the area of the end 18 which is remote from the bottom wall 3 the drive shaft 16 carries coupling means which, when the drive unit 9 is placed onto the container 2, can be brought into coupled engagement with coupling means of the drive unit 9, so that the tool 15 can then be driven rotationally by means of a drive device which is not shown and which is accommodated in the drive unit 9. In the present case the tool 15 takes the form of a stirring tool and has two stirring arms 19 and 20, which are shown diagrammatically.

Figure 4:
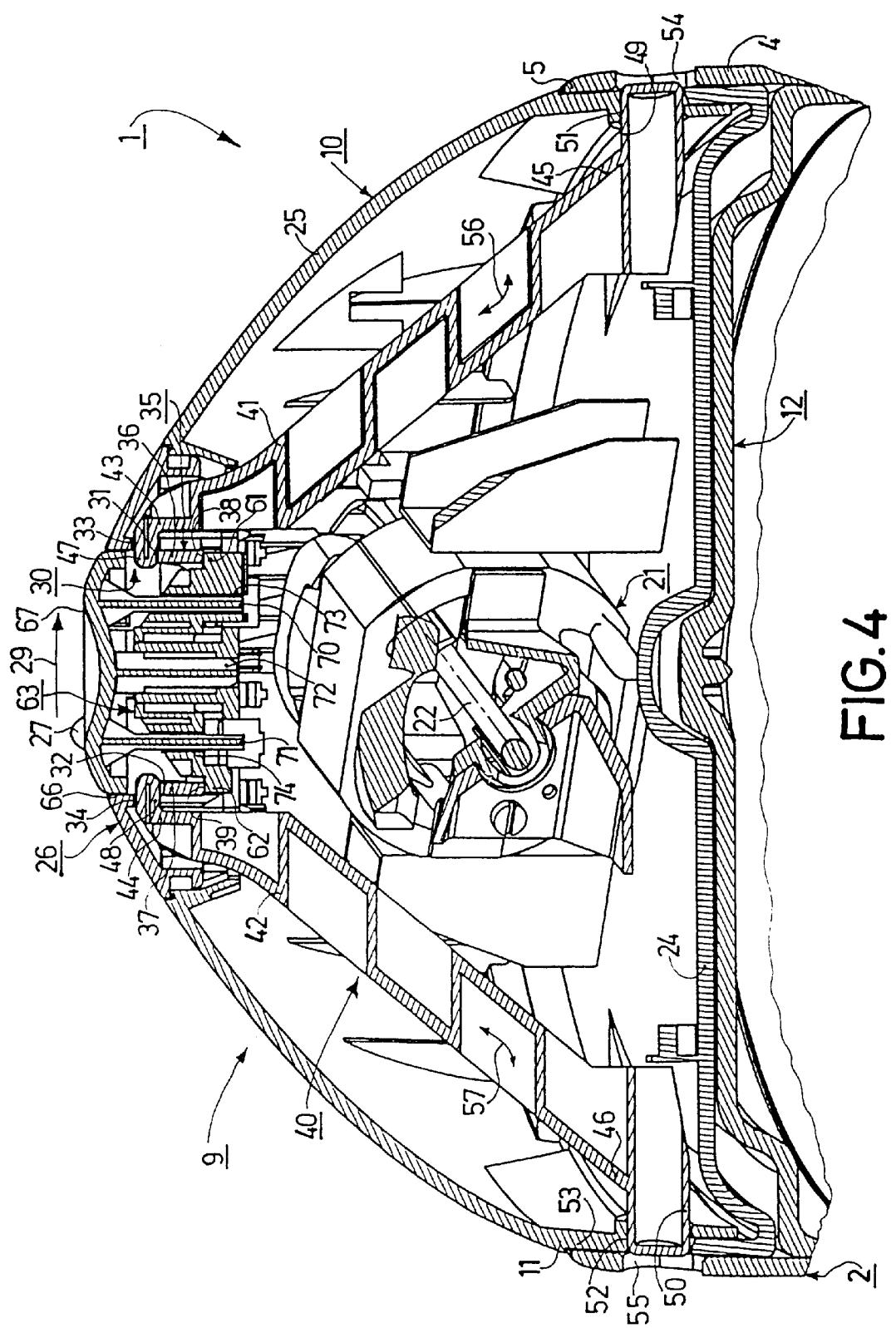
FIG. 4 is a cross-sectional view taken on the line V—V in FIG. 1 and showing a part of the kitchen appliance of FIG. 1 which includes the drive unit, the actuator grip on the drive unit being shown in its rest position and the retaining device being shown in its disengaged position.
Figure 5:
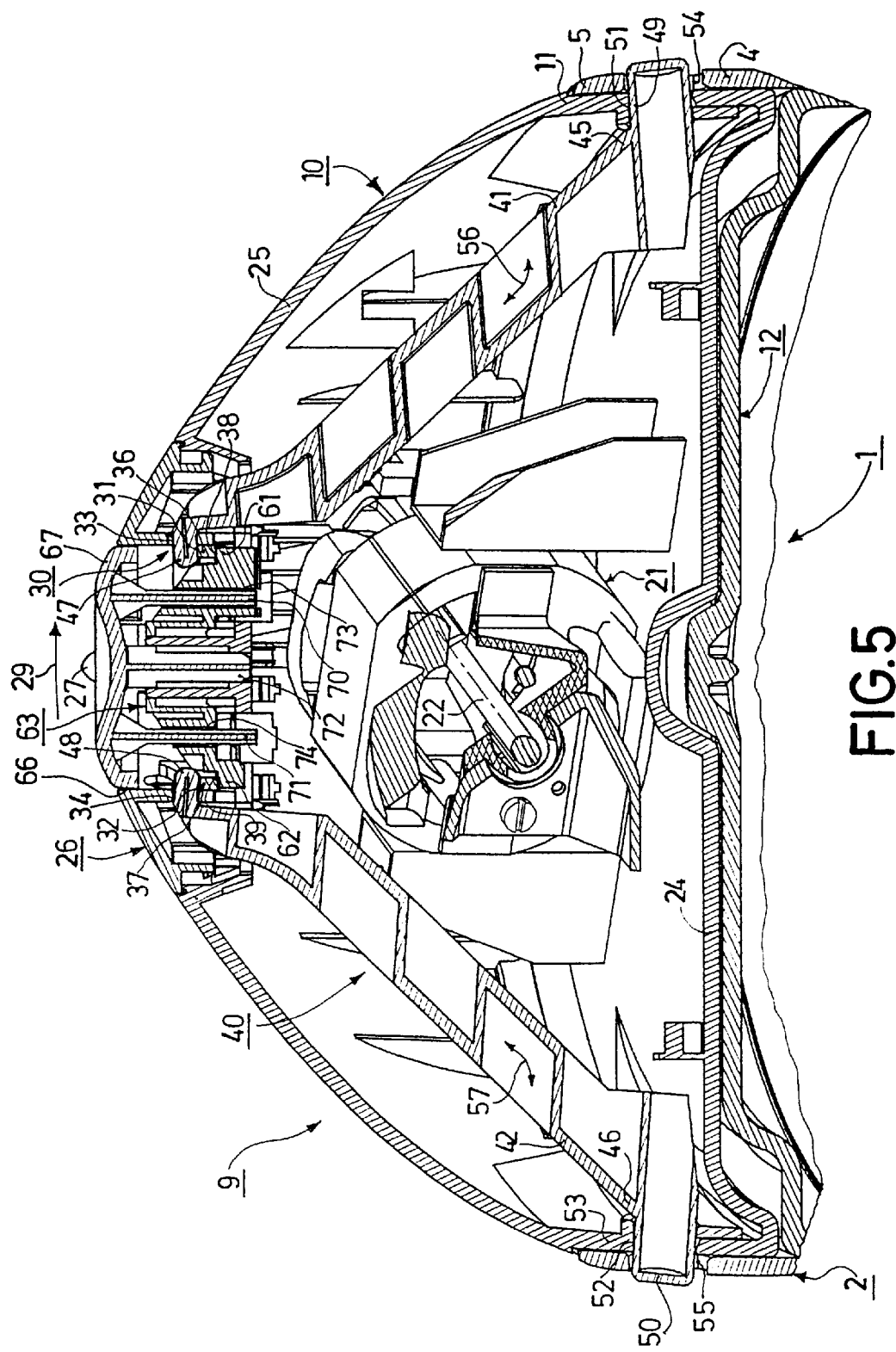
FIG. 5, in a manner similar to FIG. 4, shows part of the kitchen appliance of FIG. 1, the actuator grip being shown in its operating position and the retaining device being shown in its retaining position.
Figure 6:
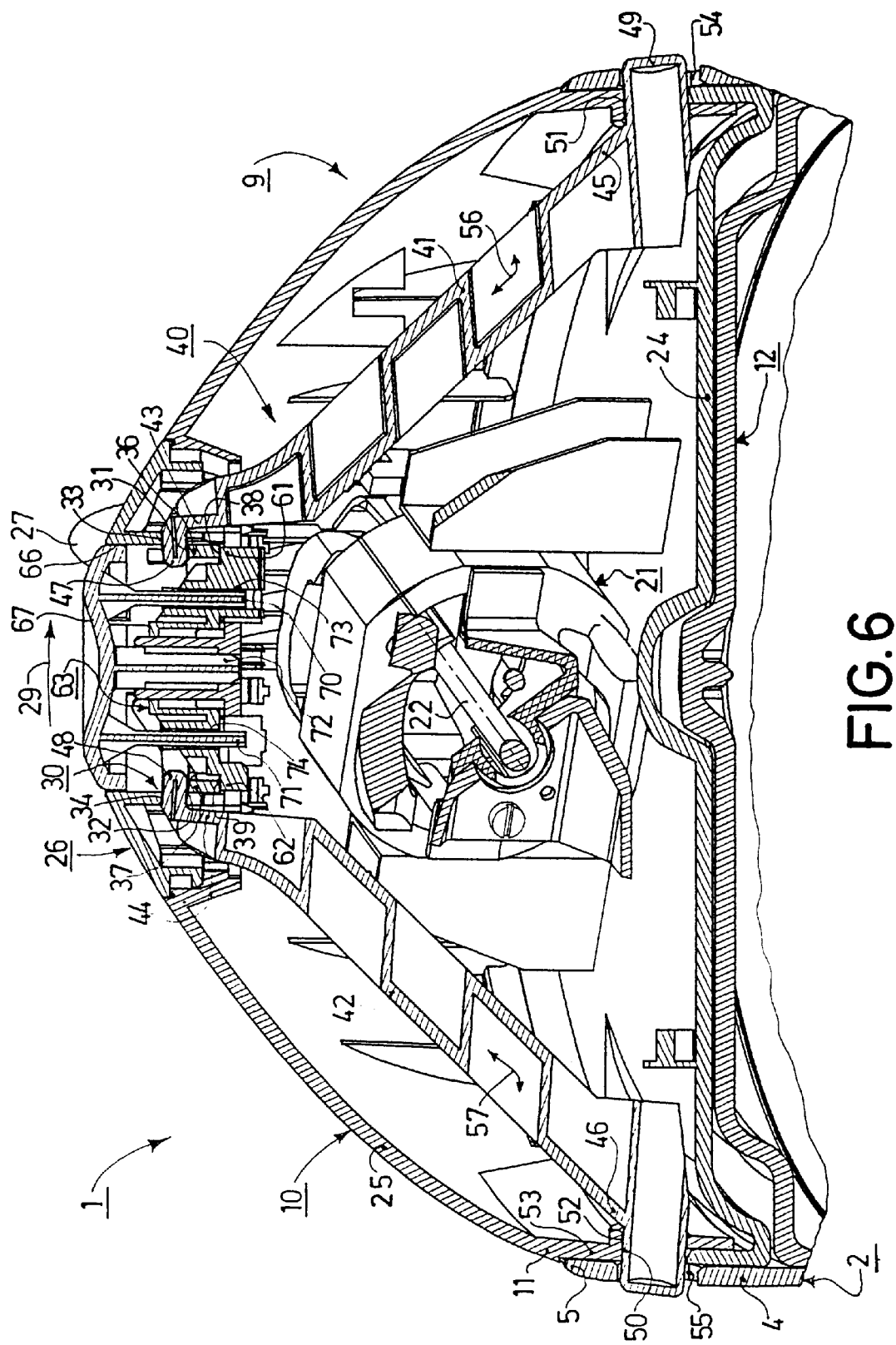
FIG. 6, in a manner similar to FIGS. 4 and 5, shows a part of the kitchen appliance of FIG. 1, the actuator grip being shown in a further operating position and the retaining device being shown in its retaining position.

The housing 10 of the drive unit 9—as can be seen in FIGS. 4 to 6—accommodates a motor 21. The motor 21, which is an electric motor, has a rotationally drivable motor shaft 22. The motor shaft 22 drive the drive device, not shown, via which the afore-mentioned coupling means of the drive unit 9 and, consequently, the tool 15 can be driven.

The housing 10 of the drive unit 9 comprises a handle 23, which is substantially club-shaped and which when the drive unit 9 has been placed onto the container 2 engages in the trough-shaped second connecting member 8, the trough-shaped second connecting member assisting in positioning the handle 23 and, consequently, the drive unit with respect to the container 2.

The housing 10 of the drive unit 9 is dome-shaped. As is apparent from FIGS. 4 to 6, the housing 10 basically comprises a housing bottom wall 24 and a housing cover wall 25, which is dome-shaped.

An advantageous feature of the kitchen appliance 1 is that in the area of the housing cover wall 25, which is remote from the bottom wall 3 of the container 2 when the drive unit 9 has been placed onto the container 2 in the area of the container rim 5, the housing 10 of the drive unit 9 carries an actuator grip 26, which is movable between a rest position shown in FIG. 4 and an operating position shown in FIGS. 1 and 5. Advantageously, the actuator grip 26 is formed by a rotary knob which is mounted so as to be rotatable with respect to the housing cover wall 25. In the present case, the rotary knob forming the actuator grip 26 is ring-shaped. The actuator grip 26 carries a first projection 27 and a second projection 28, as a result of which the actuator grip 28 can be rotated easily and conveniently, i.e. user-friendly. The second projection 28 also serves as a pointer by means of which the instantaneous position of the actuator grip 26 can be indicated in a simple manner. The rotary knob forming the actuator grip 26 is essentially arranged in the apex area of the housing cover wall 25 of the housing 10, which is also advantageous for a simple and convenient actuation, i.e. rotation, of the actuator grip 26.

The actuator grip 26, i.e. the rotary knob arranged in the apex area of the housing cover wall 25 of the housing 10, is movable in an actuating direction 29, indicated by an arrow in FIG. 1, from its rest position shown in FIG. 4 into its operating position shown in FIGS. 1 and 5. Furthermore, the actuator grip 26 can be moved in the given actuating direction 29 from the operating position shown in FIGS. 1 and 5 into a further operating position shown in FIG. 6. In this further operating position shown in FIG. 6 the motor 21 of the drive unit 9 is activated, i.e. switched on, as a result of which the tool 15 is rotationally driven by the motor 21 via the drive device, not shown. How the motor 21 is switched on will be explained hereinafter.

With respect to the actuator grip 26 is to be noted further that the actuator grip 26 is equipped with actuating means 30. The actuating means 30 of the actuator grip 26 comprise two actuating slots 31 and 32, of which only an actuating slot 31 is visible in FIGS. 2 and 3 and which each form a guide slot. The two actuating slots 31 and 32 each have a bounding wall 33 and 34 remote from the housing bottom wall 24. The two bounding walls 33 and 34 each form a guide surface, whose control function will be described in more detail hereinafter.

In addition to the actuating means 30 the actuator grip 26 further has control means 35, which comprise two control ridges 36 and 37. Each of the two control ridges 36 and 37 is bounded by a bounding wall 38 and 39, respectively, which walls face the housing bottom wall 24. The manner in which the control means 35 function will be described in more detail hereinafter.

Figure 2:
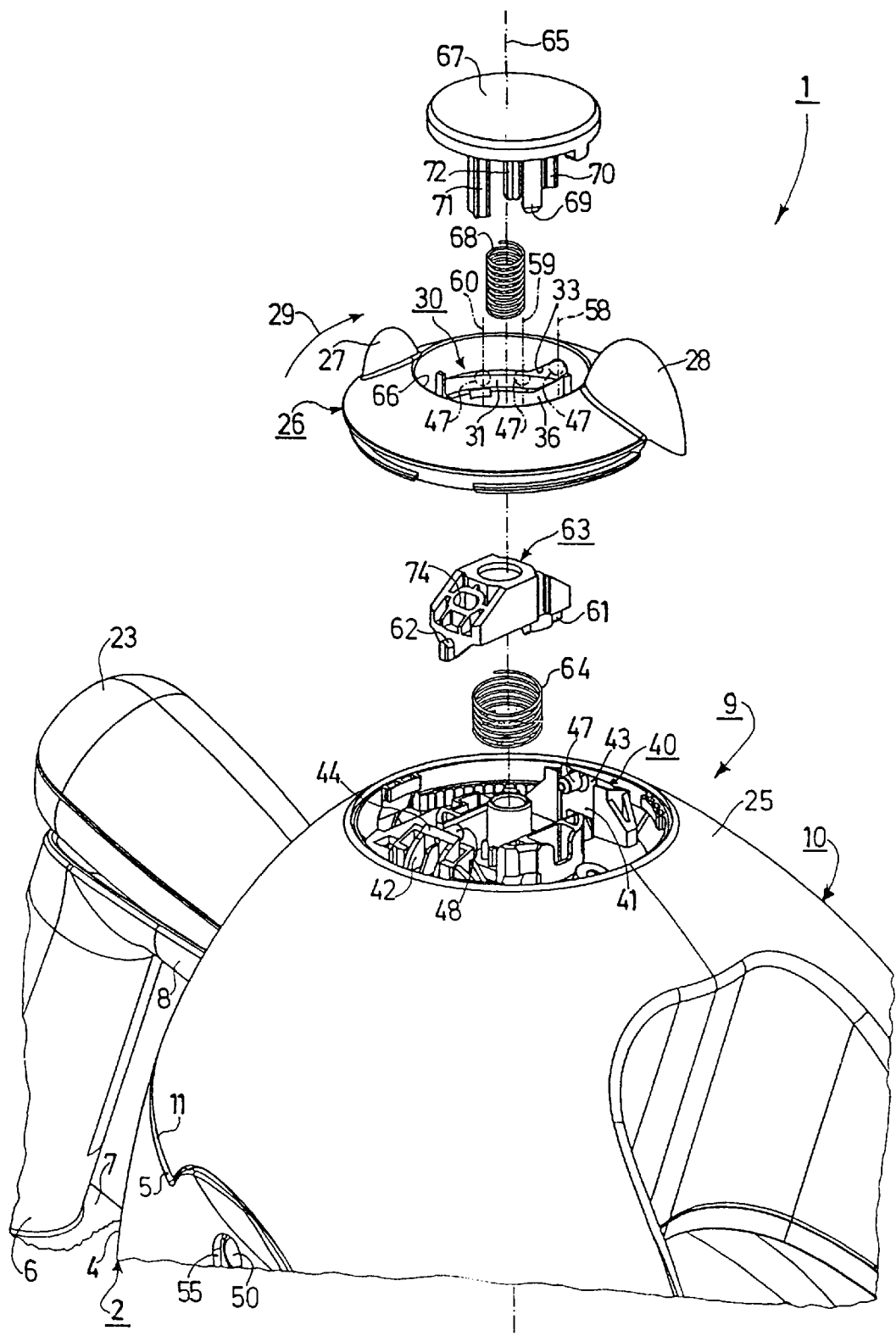
FIG. 2 is a partly exploded oblique view from the top, showing some parts, inter alia the actuator grip, of the drive unit of the kitchen appliance shown in FIG. 1.

Advantageously, the kitchen appliance 1 comprises a retaining device 40, which when the drive unit 9 has been placed onto the container 2 extends from the actuator grip 26, which is situated in the area of the housing cover wall 25, up to the container rim 5 and which when the actuator grip 26 is moved between its rest position shown in FIG. 2 and its operating position shown in FIGS. 1 and 5 is movable with the aid of the actuating means 30 of the actuator grip 26 between a disengaged position shown in FIG. 1 and a retaining position shown in FIGS. 1, 5 and 6. In its retaining position the drive unit 9 can be coupled positively to the container 2, which has the advantage that the drive unit 9 and the container 2 form an assembly where the drive unit 9 cannot inadvertently become detached from the container 2.

In the kitchen appliance 1 the retaining device 40 comprises two diametrically opposed latches 41 and 42 which are mounted in the housing 10 so as to be movable. Each of the two latches 41 and 42 has a first end 43 or 44, respectively, situated in the area of the actuator grip 26 and a second end 45 or 46, respectively, situated in the area of the container rim 5. Each of the two latches 41 and 42 cooperates with the actuating means 30 of the actuator grip 26 in the area of its respective first end 43 or 44 and with the peripheral wall 4 of the container 2 at the location of the container rim 5 in the area of its respective second end 45 or 46. For this purpose, a respective actuating pin 47 or 48 projects from each of the two latches 41 and 42 in the area of the first ends 43 and 44, which pins each engage a respective actuating slot 31 or 32 of the actuator grip 26 so as to cooperate with a guide surface formed by a bounding wall 33 or 34, respectively. For this purpose, each of the two latches 41 and 42 of the retaining device 40 comprises at its second end 45 or 46, respectively, an essentially tubular retaining pin 49 or 50, respectively, which projects from the relevant latch 41 or 42. Each of the two retaining pins 49 and 50 engages a guide hole 51 or 52, respectively, so as to be slidably guided in the longitudinal direction of the respective retaining pin 49 or 50. The two guide holes 51 and 52 have been formed in a substantially hollow cylindrical wall portion 53 of the housing 10. Said wall portion 53 connects the housing cover wall 25 to the housing bottom wall 24 of the housing 10.

In the area of the container rim 5 the container 2 of the kitchen appliance 1 has two passages 54 and 55 in its peripheral wall 4. These two passages 54 and 55 are substantially coaxial with the guide holes 51 and 52 and with the retaining pins 49 and 50 when the drive unit 9 is mounted properly on the container 2.

As already stated, the retaining device 40 is movable between a disengaged position shown in FIG. 4 and a retaining position shown in FIGS. 1, 5 and 6 with the aid of the actuating means 30 of the actuator grip 26. Expressed in other terms this means that the two latches 41 and 42 are movable between the disengaged position shown in FIG. 4 and the retaining position shown in FIGS. 5 and 6 in accordance with two actuating movements corresponding to the two gently curved double-headed arrows 56 and 57 shown in FIGS. 4 to 6. When the latches 41 and 42 have been moved into their retaining positions in accordance with the double-headed arrows 56 and 57, i.e. when the retaining device 40 has been set to its retaining position, each of the two retaining pins 49 and 50 of the respective latches 41 and 42 engages a respective passage 54 or 55, as can be seen in FIGS. 1, 5 and 6.

Figure 3:
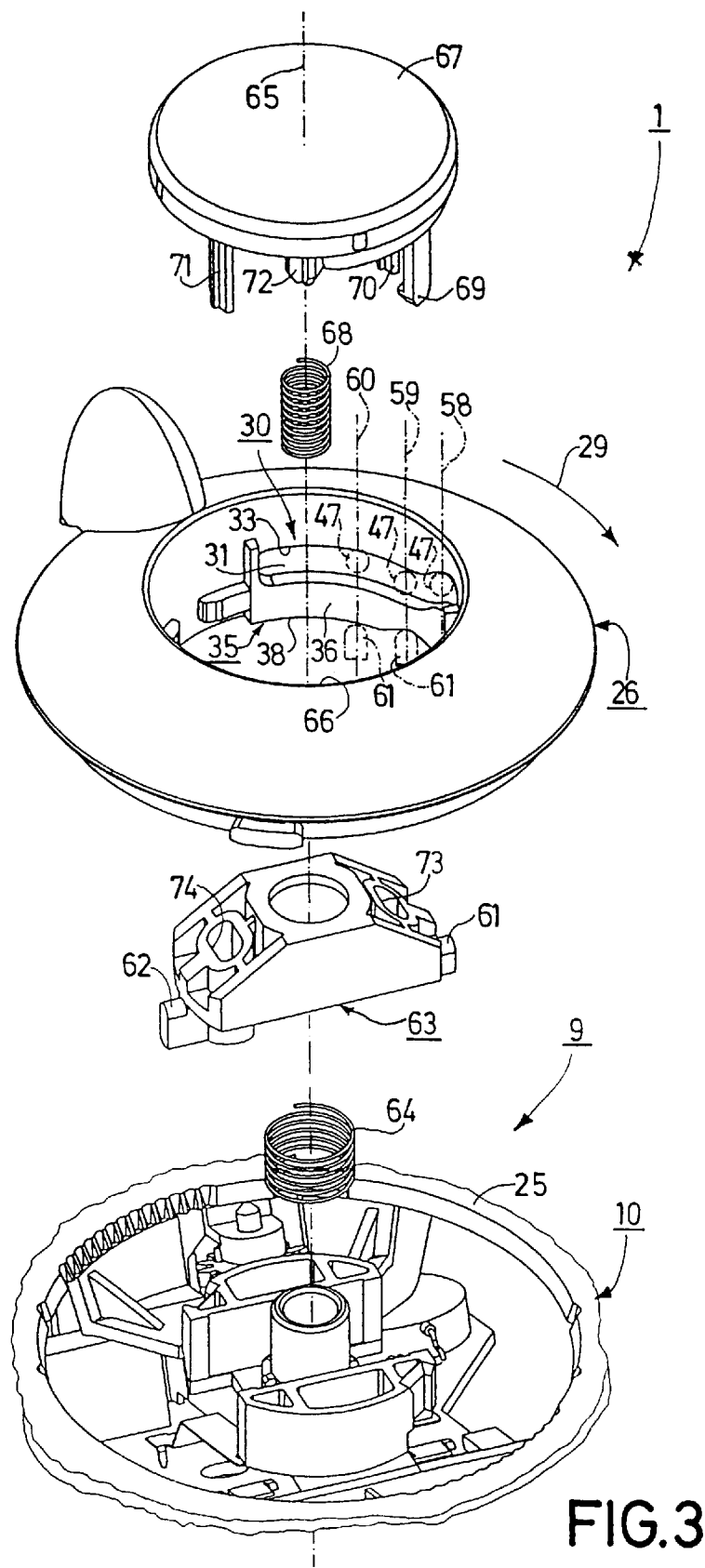
FIG. 3, in a manner similar to FIG. 2, shows some parts of a drive unit of a kitchen appliance, which parts have been modified slightly in comparison with the parts shown in FIG. 2.

When the actuator grip 26 is in its rest position the actuating pin 47 occupies a relative position with respect to the guide surface formed by the bounding wall 33 of the actuating slot 31, which relative position is represented by a dash-dot line 58 in FIGS. 2 and 3. From the rest position the actuator grip 26 is movable, i.e. rotatable, into its operating position in the given actuating direction 29. When the actuator grip 26 has been moved into its operating position the actuating pin 47 occupies a relative position with respect to the guide surface formed by the bounding wall 33 of the actuating slot 31, which relative position is represented by a dash-dot line 59 in FIGS. 2 and 3. The actuator grip 26, which is movable from its rest position into its operating position, can be moved in the given actuating direction 29 from its operating position shown in FIGS. 1 and 5 into a further operating position in which the motor 21 of the drive unit 9 is activated, i.e. is switched on, and in which the drive unit 9 is fastened to the container 2 by means of the retaining device. In the further operating position, which is shown in FIG. 6, the actuating in 47 occupies a relative position with respect to the guide surface formed by the bounding wall 33 of the actuating slot 31, which relative position is represented by a dash-dot line 60 in FIGS. 2 and 3.

With respect to the guide surface formed by the bounding wall 34 of the actuating slot 32, the actuating pin 31 occupies three diametrically opposite relative positions corresponding to the dash-dot lines 58, 59 and 60.

As already stated hereinbefore, the actuator grip 26 also has control means 35, which are essentially formed by two control ridges 36 and 37 in which each control ridge has a bounding wall 38 and 39, respectively, which serves as a guide surface. The two guide surfaces formed by the bounding walls 38 and 39 cooperate with two rounded projections 61 and 62. The two projections 61 and 62 are integral parts of a switching block 63, which is movable against the force of a pressure spring 64 in a direction parallel to an axis 65 about which the actuator grip 26 is rotatable.

When the actuator grip 26 is in the rest position shown in FIG. 4, the projection 62 of the switching block 63 is in a relative position represented by the dash-dot line 58 in FIGS. 2 and 3 with respect to the guide surface formed by the bounding wall 38 of the control ridge 36. When the actuator grip 26 is in the operating position shown in FIGS. 1 and 5 the projection 62 of the switching block 63 occupies a relative position represented by the dash-dot line 59 with respect to the guide surface formed by the bounding wall 38. In the afore-mentioned further operating position of the actuator grip 26 the projection 62 of the switching block 63 occupies a relative position represented by the dash-dot line 60 with respect to the guide surface formed by the bounding wall 38. It is to be noted that the projection 62 and the bounding wall 38 of the control ridge 36 are not visible in FIG. 2.

Likewise, the control projection 61 of the switching block 63 also assumes three relative positions with respect to the guide surface formed by the bounding wall 39 of the control ridge 37, which positions correspond to the relative positions represented by the dash-dot lines 58, 59 and 60 because they are diametrically opposed to these relative positions in relation to the axis 65.

By means of the two guide surfaces formed by the bounding walls 38 and 39 the two projections 61 and 62 of the switching block 63—when the actuator grip 63 has been set to its further operating position—are movable against the force of the pressure spring 64 in a direction parallel to the axis 65, as a result of which the switching block is also moved against the force of the pressure spring 64 in a direction parallel to the axis 65. During this movement the switching block 63 closes a switch, not shown, by means of which the motor 21 of the kitchen appliance 1 can be switched on.

In the kitchen appliance 1 the retaining device 40 has been set to its disengaged position when the actuator grip 26 is in its rest position and the motor 21 of the kitchen appliance 1 is then switched off via the switching block 63.

When the actuator grip 26 has been set to its operating position shown in FIGS. 1 and 5 the retaining device 40 occupies its retaining position and, consequently, the drive unit 9 and the container 2 are positively coupled to one another in a reliable manner and the motor 21 of the kitchen appliance 1 is switched off via the switching block 63.

When the actuator grip 26 has been set to its further operating position shown in FIG. 5 the retaining device 40 also occupies its retaining position and, consequently, the motor 21 of the kitchen appliance 1 is switched on via the switching block 63. Thus, the kitchen appliance 1 is put into operation in the further operating position.

As can be seen in the Figures, the actuator grip 26 in the kitchen appliance 1 is not constructed as an imperforate cap but the actuator grip 26 has a passage 66 in its central area. In this passage 66 a push-button 67 is arranged, which is movable in a direction parallel to the axis 65 against the force of a pressure spring which forms a reset spring 68. By means of a latching hook 69 the push-button 67 is latched to the switching block 63. The push-button 67 comprises two guide members 70 and 71 and, in addition, a guide pin 72 which is coaxial with the axis 65 and on which the reset spring 68 is arranged. The two guide members 70 and 71 engage in two guide holes 73 and 74 formed in the switching block 63. One guide member 70 of the two guide members 70 and 71 also serves for the actuation of the aforementioned electrical switch for switching on the motor 21 of the kitchen appliance 1, i.e. only in the case that the actuator grip 26 has been set to its operating position shown in FIG. 5. Thus, by depression of the push-button 67 the electrical switch, not shown, for switching on the motor 21 of the kitchen appliance 1 can be actuated, i.e. closed, via the guide member 70, so that the motor 21 of the kitchen appliance 1 can also be switched on in this way. The push-button 67 has been provided in order to switch on the motor 21 of the kitchen appliance 1 for a comparatively short time by a brief depression of the push-button 67. Conversely, the actuator grip 26 serves for starting the motor 21 for a longer period of operation, i.e. so-called continuous operation.

In the kitchen appliance 1 described hereinbefore it is achieved by simple means and with only a small expenditure that after the drive unit 9 has been placed onto the container 2, which can be effected by hand, the drive unit 9 and the container 2 are reliably coupled to form an assembly which should be coupled in operation of the kitchen appliance 1 by simply actuating the movable actuator grip 26 arranged in the area of the housing cover wall 25 of the housing 10, as a result of which a rotation of the container 2 with respect to the drive unit 9 is precluded and it is excluded that the container and the drive unit are moved apart. The provision of the actuator grip 26 in the apex area of the dome-shaped housing 10, i.e. in the apex area of the dome-shaped housing cover wall 25 of the housing 10, guarantees a convenient and easy actuation, i.e. rotation, of the actuator grip 26. The provision of two diametrically opposite latches 41 and 42 to form the retaining device 40 ensures a very reliable positive coupling of the drive unit 9 to the container 2.

The invention is not limited to the embodiment described hereinbefore by way of example. It is also possible to construct an actuator grip for actuating a retaining device as a sliding knob without departing from the scope of the invention. Moreover, a retaining device may alternatively comprise at least one pivotably mounted lever instead of at least one latch.

We claim:

1. A kitchen appliance which comprises: a container which comprises a bottom wall and a peripheral wall connected to the bottom wall, which peripheral wall terminates in a container rim which is remote from the bottom wall, a drive unit which comprises a housing with which the drive unit can be placed onto the container in the area of the container rim, which housing accommodates a motor of the drive unit for driving at least one tool situated in the container during operation, wherein in an area of the housing cover wall, the housing carries an actuator grip which is movable between a rest position and an operating position, which actuator grip is equipped with actuating means, and a retaining device, which retaining device, when the drive unit has been placed onto the container, extends from the actuator grip, up to the container rim of the container and which, when the actuator grip is moved between its rest position and its operating position, is movable between a disengaged position and a retaining position with the aid of the actuating means of the actuator grip and by means of which, in the retaining position, the drive unit can be coupled to the container.

2. A kitchen appliance as claimed in claim 1, wherein the retaining device comprises at least one latch which is mounted in the housing so as to be movable, which latch cooperates with the actuating means of the actuator grip in the area of a first end and with the peripheral wall of the container at the location of the container rim in the area of a second end.

3. A kitchen appliance as claimed in claim 2, wherein the retaining device comprises two diametrically opposed latches.

4. A kitchen appliance as claimed in claim 3, wherein at its second end each of the two latches of the retaining device comprises a retaining pin which projects from the latch, and in the area of the container rim the container has two passages in its peripheral wall, the retaining pin of each of the two latches engaging a passage when the retaining device is in its retaining position.

5. A kitchen appliance as claimed in claim 1, wherein the actuator grip, which is movable from its rest position into its operating position, can be moved in the given actuating direction from its operating position into a further operating position in which the motor of the drive unit is activated and in which the drive unit is coupled to the container by means of the retaining device.

6. A kitchen appliance as claimed in claim 1, wherein the actuating means of the actuator grip have at least one actuating slot which forms a guide slot in which an actuating pin which projects from the retaining device engages.

7. A kitchen appliance as claimed in claim 1, wherein the actuator grip is formed by a rotary knob which is mounted so as to be rotatable with respect to the housing cover wall.

8. A kitchen appliance as claimed in claim 7, wherein the housing of the drive unit is dome-shaped, and the rotary knob forming the actuator grip is arranged in an apex area of the housing cover wall of the housing.

9. A kitchen appliance which comprises: a container for holding food products, which container comprises a bottom wall for placing the container on a working surface during operation of the kitchen appliance and a peripheral wall connected to the bottom wall, which peripheral wall terminates in a container rim which is remote from the bottom wall, a drive unit which comprises a housing with which the drive unit can be placed onto the container in the area of the container rim, which housing accommodates a motor of the drive unit for driving at least one tool situated in the container during operation, wherein in an area of the housing cover wall, which is remote from the bottom wall of the container when the drive unit has been placed onto the container in the area of the container rim, the housing carries an actuator grip which is movable between a rest position and an operating position, which actuator grip is equipped with actuating means, and a retaining device, which retaining device, when the drive unit has been placed onto the container, extends from the actuator grip, which is situated in the area of the housing cover wall, up to the container rim of the container and which, when the actuator grip is moved between its rest position and its operating position, is movable between a disengaged position and a retaining position with the aid of the actuating means of the actuator grip and by means of which, in the retaining position, the drive unit can be coupled to the container.

10. A kitchen appliance which comprises a container for holding food products, which container comprises a bottom wall for placing the container on a working surface during operation of the kitchen appliance and a peripheral wall connected to the bottom wall, which peripheral wall terminates in a container rim area which is remote from the bottom wall and in which area the container has two passages in its peripheral wall, a drive unit which comprises a housing with which the drive unit can be placed onto the container in the area of the container rim, which housing accommodates a motor of the drive unit for driving at least one tool situated in the container during operation, wherein in an area of the housing cover wall, which is remote from the bottom wall of the container when the drive unit has been placed onto the container in the area of the container rim, the housing carries an actuator grip which is movable between a rest position and an operating position, which actuator grip is equipped with actuating means, and a retaining device which comprises two diametrically opposed latches having a first and a second end wherein at its second end each of the two latches comprises a retaining pin which projects from the latch, each retaining pin being mounted in the housing so as to be movable, and wherein each latch cooperates with the actuating means of the actuator grip in the area of the first end and with the peripheral wall of the container at the location of the container rim in the area of the second end when the drive unit has been placed onto the container and engages a passage when the retaining device is in its retaining position, said actuator grip being formed by a rotary knob which is mounted so as to be rotatable with respect to the housing cover wall and is situated in the area of the housing cover wall, said retaining device comprising said latches, when said rotary knob is moved between its rest position and its operating position, being movable between a disengaged position and a retaining position by means of which, the drive unit can be coupled to the container.

* * * * *